Feb. 6, 1934.  W. H. NOURSE ET AL  1,945,976
SKIDDING ARCH
Filed July 16, 1930  4 Sheets-Sheet 1
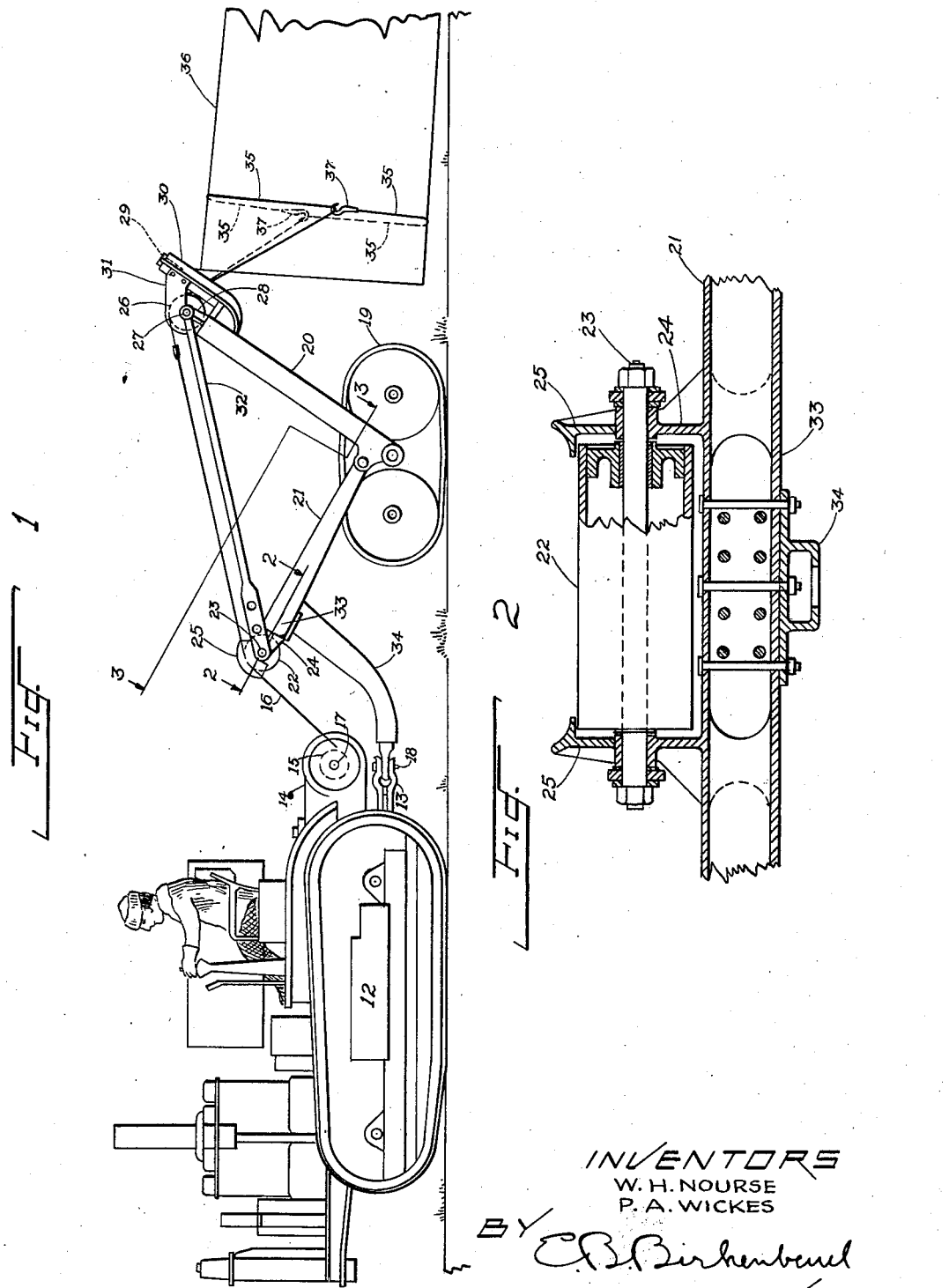
INVENTORS
W. H. NOURSE
P. A. WICKES
BY
ATTORNEY

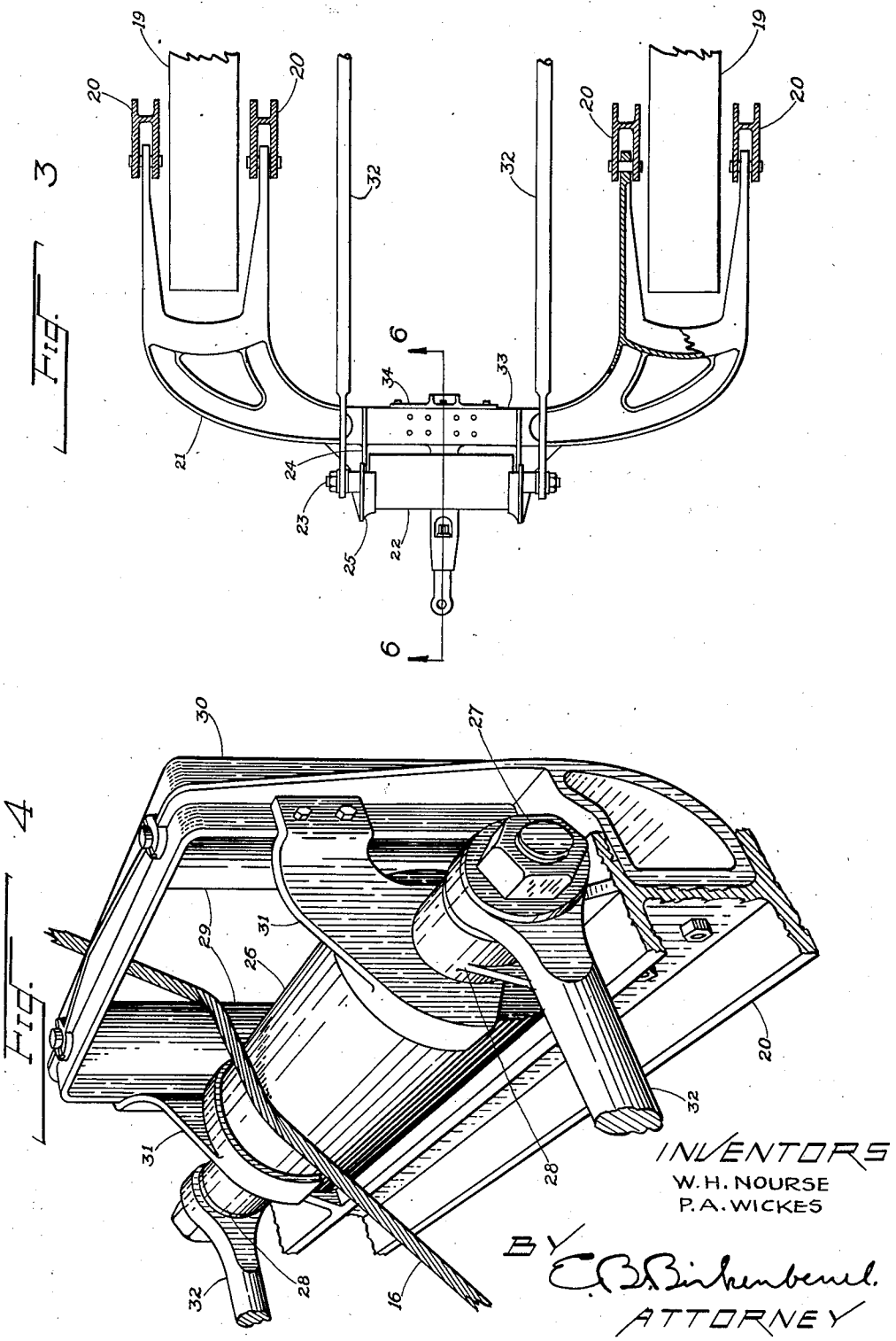

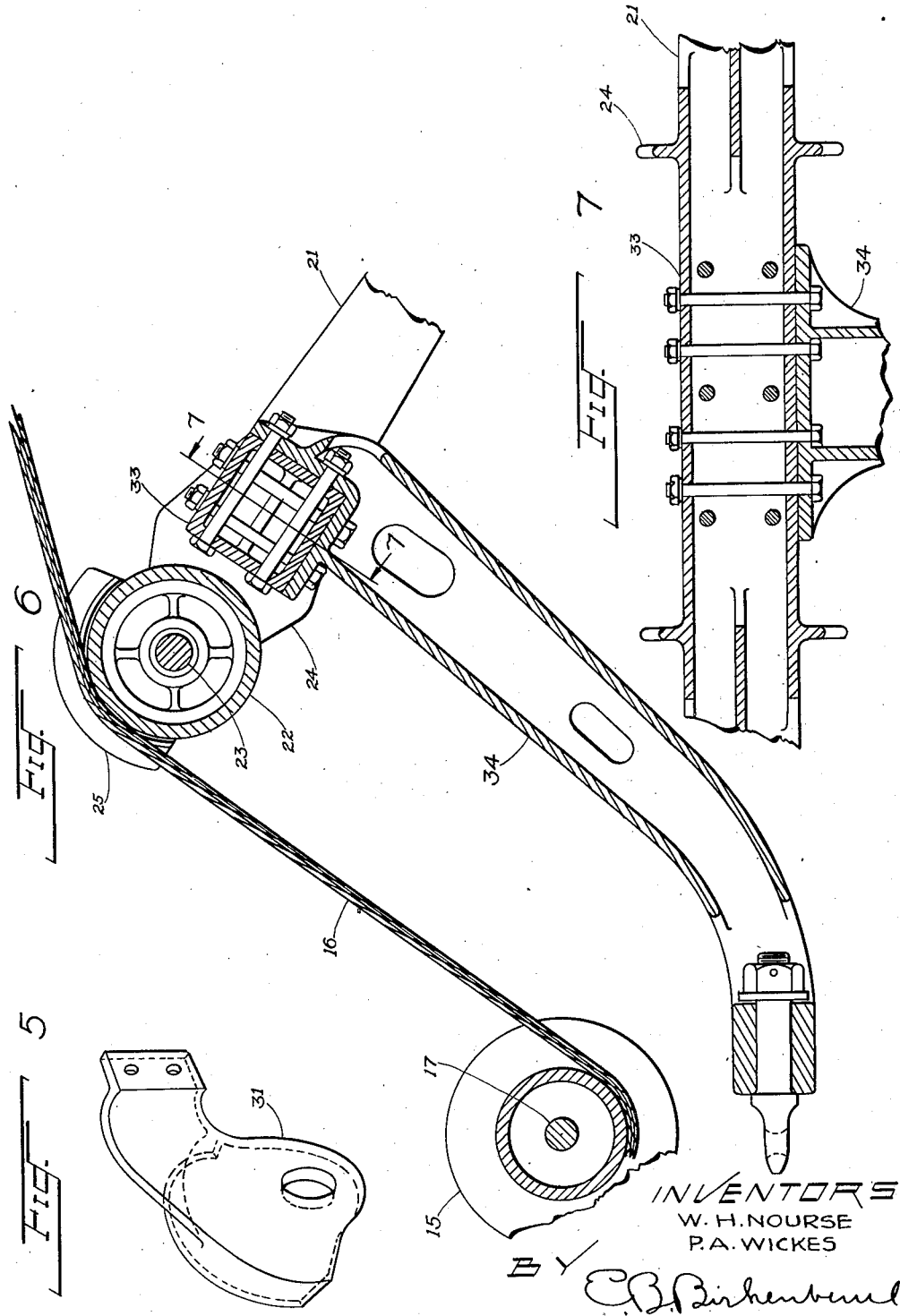

Feb. 6, 1934.   W. H. NOURSE ET AL   1,945,976
SKIDDING ARCH
Filed July 16, 1930   4 Sheets-Sheet 4
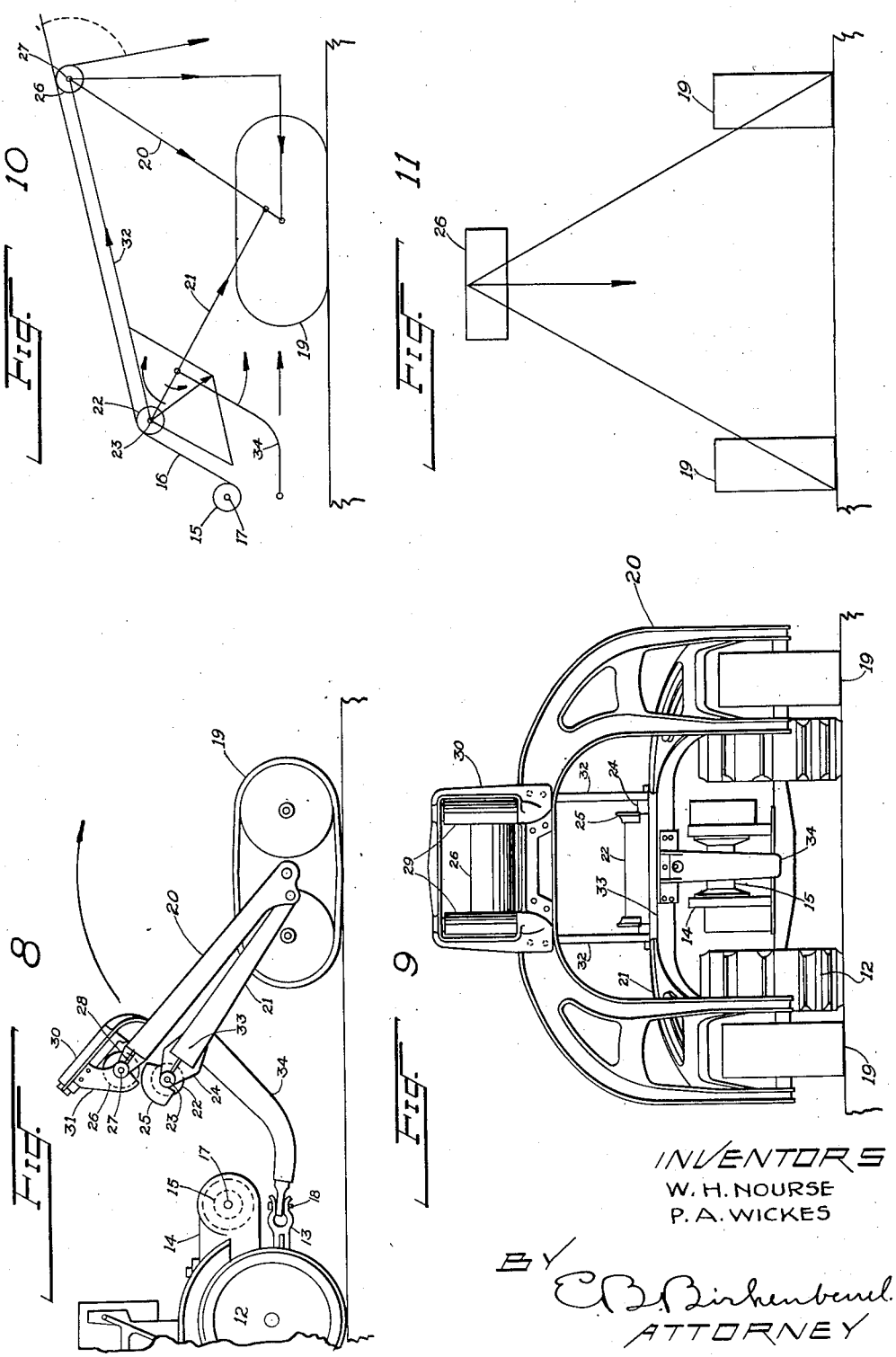
INVENTORS
W. H. NOURSE
P. A. WICKES
BY
E. B. Birkenbeuel.
ATTORNEY Patented Feb. 6, 1934

1,945,976

UNITED STATES PATENT OFFICE 1,945,976

SKIDDING ARCH

Walter H. Nourse and Powers A. Wickes, Portland, Oreg., assignors to Electric Steel Foundry Company, Portland, Oreg.

Application July 16, 1930. Serial No. 468,404

14 Claims. (Cl. 254—166)

This invention relates generally to the logging industry, and particularly to skidding arches for use in that industry. These skidding arches have been used in which there are separated ground supports connected by an upwardly extending arch bridging the space between the supports. The arch has been connected through a tongue with a hitch of a tractor and in these structures a cable is led from a drum on the tractor through a fairlead on the arch. In the operation of the arch its cable, or line is led out to the log, or logs, and the logs have been drawn into suspended position, usually directly under the arch and between the ground supports. These prior apparatuses had some faults among which are the excessive width of the apparatus, the limitations as to maneuverability of the apparatus, the excessive height of the apparatus, and some defects with relation to the action of the trailer through its hitch and the pull of the cable on the tractor itself, these factors interfering with a proper distribution of the weight of the tractor for best tractor conditions. Some of the prior devices have been provided with upwardly inclined, or gooseneck form tongues giving to the apparatus immediately at the rear of the tractor ample clearance to prevent the hanging up of the tractor in passing over obstructions, but in these apparatuses having such tongue convenient provision has not been made for handling the line in its passage from the drum through the fairlead.

With these disadvantages in prior structures the improvements in the present invention will be more readily understood. The invention contemplates an arch in which the ground supports may be placed more nearly together so that the apparatus may require less clearance in maneuvering between obstructions in the woods and to this end is provided with crawling type ground supports which, by reason of the low center of gravity give to the arch reasonable stability with a comparatively narrow overall support. This arrangement of ground supports is made feasible by inclining the load-carrying support, or arch rearwardly from its attachment to the ground supports so that the attached logs, even with the narrow spacing of the supports will not prevent efficient maneuvering of the apparatus as a whole. This advantage as to maneuvering can be achieved to the greatest extent if the rearward inclination places the log as it is suspended to the rear of the ground supports, but any inclination adds to the ease of maneuvering the apparatus. The rearward inclination also adds to the possibility of reducing the height of the load support so that the clearance in this respect may be reduced and thus permit of the apparatus passing under obstructions which otherwise might not be possible. This low arch, or load support also assists in lowering the gravity disposition of the trailer so as to make a narrower support available and at the same time take care of the tremendous side stresses to which it is subjected.

The invention also contemplates a hitch at the front end of the load-carrying and hitch-forming frame with the tractor at a location below the drum so that the lever action of the load on the hitch may be, through the pull of the cable, made to more nearly maintain a proper distribution of weight from front to rear of the tractor. In this connection the tongue, or frame, is provided with what may be termed a "reaction wheel" by which the direction of the line of the cable between the drum and the fairlead may be readily deflected to give the desired line of force exerted by the cable with relation to the hitch so that its effect on the weight distribution of the tractor may be adjusted as desired, the use of the reaction wheel having a further function of carrying the cable to a position permitting the use of a gooseneck formation of tongue adding to the clearance directly back of the tractor.

These, and other objects, will become more apparent from the specification following as illustrated in the accompanying drawings, in which:

Fig. 1 is a side elevation of the skidding arch with its load being drawn by a tractor of the crawler type.

Fig. 2 is a section taken along the line 2—2 in Fig. 1.

Fig. 3 is a section taken along the line 3—3 in Fig. 1.

Fig. 4 is a perspective view of the fairlead rolls mounted on top of the arch.

Fig. 5 is a perspective view of a guard on the horizontal fairlead roll.

Fig. 6 is a section taken along the line 6—6 in Fig. 3.

Fig. 7 is a section taken along the line 7—7 in Fig. 6.

Fig. 8 is a side elevation showing the arch in a collapsed form.

Fig. 9 is a rear elevation of the arch looking toward the tractor.

Fig. 10 is a stress diagram.

Fig. 11 is a diagram showing the inherent stability of the vehicle.

Similar numbers of reference refer to similar parts throughout the several views.

Referring in detail to the drawings, there is illustrated a common form of tractor 12 of the crawler type provided with the usual draw bar 13 and cable winding hoist 14 on whose drum 15 is wound a cable 16. The shaft 17 of the drum 15 is directly above the draw bar pin 18.

Referring directly to the skidding arch vehicle itself same will be seen to include a pair of ground-engaging elements 19 preferably of the crawler type, midway between whose ends is mounted the load support in the form of an arch 20. Each side of the arch 20 is supported by a crawling element 19 which forms the ground supports for the trailer. The arch 20 inclines rearwardly in a manner to overhang the vehicle, for a plurality of reasons.

At each side of the arch 20 and near the lower end thereof is pivotally attached the tongue 21 which is also in the form of an arch and has mounted thereon what will be referred to as a reaction roll 22 which is carried by the shaft 23 whose ends are supported by the standards 24. A guard 25 is placed at each end of the roll 22 and the standards 24.

On the arch 20 is mounted a horizontal fairleading roll 26 which is carried by a shaft 27 mounted on the standards 28. Behind the roll 26 are the two spaced vertical fairleading rolls 29 which are carried by a closed frame 30 to which is secured a pair of guards 31 the purpose of which is to prevent the cable 16, or any extension thereof, from running between the ends of the roll 26 and its supporting standards 28. The roll 26 is held in spaced relation to the roll 22 by means of a pair of struts 32 which join the ends of the shaft 27 to the ends of the shaft 23.

To the middle portion 33 of the tongue 21 is bolted the rear end of a goose neck 34 whose forward end is joined to the draw bar 13 by means of the pin 18 in a manner to provide the maximum amount of flexibility at this point.

To the cable 16 is attached one or more choker lines 35 by means of which a log or logs 36 may be lifted free of the ground at the forward end, but with the forward end of the log preferably behind the rearmost portion of the arch 20 and ground supports. In other words, the log 36 at no time need pass between the elements 19, nor between any portion of the arch 20.

Obviously, it is desirable with this system of logging to make the line 35 fast to the log 36 as close as practical to its end, somewhat after the fashion shown in Fig. 1, in which a bridle is employed to secure a better lifting action. It will be noted that the choker hooks 37 are well below the top of the log 36, bringing the line 35 more nearly to a vertical position, the advantages of which can be clearly seen, in view of the fact that it is desired to keep the foremost part of the log behind the arch rather than under it.

With this construction the inclination of the arch providing for flexibility and maneuvering and the low gravity of the arch as a whole, including the crawling supports, makes possible a comparatively narrow construction with sufficient stability to stand the side thrusts encountered in the pull of the cable and also in maneuvering the apparatus. The inclination in this connection also makes it possible to reduce slightly the height of the arch and this again reduces the center of gravity with its attendant possibility of narrowing the ground support overall. The form of the frame extending from the load carrying point at the fairlead to the hitch is of triangular shape providing a lever at the first class with its fulcrum at the connection of the frame with the ground supports and the effect of the lever action on the tractor may be compensated for and adjusted more or less by the point of application of force with relation to the hitch and the adjustment, or direction, of that force. In the present structure the drum is placed above the point of the hitch and the direction of the pull of the cable may be varied by the reaction roller to give whatever adjustment may be desired in the distribution of the weight of the tractor through the pull of the cable on the tractor. This pull of the cable with the rearward inclination of the arch is preferably made to lift the forward end of the tractor and consequently place upon the hitch a greater proportion of the weight of the tractor than the rear end alone and this tendency is increased with an articulation of the tractor relatively to the trailer due to sharp inclines and a consequent reduction in the available weight at the rear end of the tractor. In this way these forces, thrusts and loads, may be made to harmonize with structures given greater flexibility and clearances for maneuvering and with structures of less weight for handling the same loads. The counterthrust of the reaction roll also tends to prevent the doubling up of the tongue.

We claim:

1. A skidding arch having in combination a pair of laterally spaced crawler type ground-engaging members, a frame pivotally mounted on said ground-engaging members having its upper portion over-hanging the front and rear ends of said ground-engaging members, the forward end thereof constituting a means for attaching same to a tractor and the rearward end thereof constituting a means for supporting a load when the arch is attached to a tractor and the load in position to be moved behind the rearmost portion of said ground-engaging members.

2. A skidding arch having in combination a pair of crawler elements laterally spaced from each other, an arched frame pivotally mounted on both of said crawler elements between the front and rear ends thereof, said arch inclining rearwardly in a manner to over-hang the rearmost portions of said crawlers, fairlead rolls mounted on the top of said arch, an arch shaped tongue having its open ends attached to the lower end of said first mentioned arch, a goose neck for attaching the forward end of said tongue to the draw bar of a tractor, a reaction roll mounted on said tongue, and a cable winding mechanism mounted above said draw bar connection wherefrom a cable can lead over said reaction roll and fairleading roll to a load.

3. A skidding arch having in combination a pair of crawler vehicles laterally spaced from each other, a connecting arched frame pivotally joined to each of said crawlers at an intermediate point, an arched tongue having its open ends attached to said arch and sloping upwardly and forwardly, strut members between the uppermost ends of said tongue and arch forming same into a truss, a goose neck attached to said tongue and to the draw bar of a tractor, and a cable winding mechanism mounted over said point of attachment to the tractor including a cable passing over the upper ends of the tongue and arch whereby the resulting thrust from the load carrying the weight of the tongue and arch and the pull on the cable may adjust the forces exerted on the tractor.

4. A log transporting vehicle having in combination ground-engaging crawler elements laterally spaced from each other, an arched frame mounted on said crawler elements having a triangular shape in a longitudinal direction having the lowermost point of the triangle pivotally attached to the crawlers, rollers mounted on the uppermost corners of the triangle overhanging said crawlers to the front and to the rear, a cable winding mechanism adapted to be mounted on a tractor, a goose neck between the forward end of said triangular shaped frame and the draw bar of a tractor, and a cable from said cable winding mechanism passing upwardly around the forward end of said frame and downwardly around the rearward end of said frame to the load.

5. A skidding arch consisting of a longitudinally triangular trussed frame having one corner of said triangle lowermost, said triangular frame having an arch shaped transverse section, a crawler element attached to each lowermost side of said frame, a tongue at the forward end of said truss member for attaching same to the draw bar of a tractor, a cable winding mechanism mounted above said point of attachment to the tractor, a reaction roll on the forward end of said trussed frame, a fairleading roll at the rearward end of said trussed frame, and a cable from said cable winding mechanism extending upwardly around said reaction roll and downwardly around said fairleading roll.

6. A skidding arch having in combination a pair of crawler elements laterally spaced from each other, a trussed frame pivotally mounted on said crawler elements, said trussed frame having a triangular longitudinal section and an arched transverse section, a goose neck between the forward end of said frame and the draw bar of a tractor, fairleading rolls at the foremost and rearmost end of said frame at the top thereof, and a cable winding mechanism mounted over said point of attachment to the tractor below said fairleading rolls.

7. In a material moving apparatus, the combination of a power-actuated tractor; a vehicle comprising crawling type ground supports and a load-carrying and hitch-securing frame pivotally mounted on the ground supports and overhanging to the rear of its attachment to the ground supports and hitched at its forward end to the tractor, said frame acting as a lever of the first class between the load and the hitch; a fairlead on the frame above and to the rear of the attachment of the frame to the ground supports; a drum on the tractor; and a line extending from the drum through the fairlead.

8. In a material moving apparatus, the combination of a power-actuated tractor; a vehicle comprising crawling type ground supports and a load-carrying and hitch-securing frame pivotally mounted on the ground supports and overhanging to the rear of its attachment to the ground supports and hitched at its forward end to the tractor, said frame acting as a lever of the first class between the load and the hitch; a fairlead on the frame above and to the rear of the ground supports; a drum on the tractor; and a line extending from the drum through the fairlead.

9. In a material moving apparatus, the combination of a power-actuated tractor; a vehicle comprising crawling type ground supports and a load-carrying and hitch-securing frame pivotally mounted on the ground supports and overhanging to the rear of its attachment to the ground supports and hitched at its forward end to the tractor, said frame acting as a lever of the first class between the load and the hitch; a fairlead on the frame above and to the rear of the attachment of the frame to the ground supports; a drum on the tractor above the hitch; and a line extending from the drum through the fairlead.

10. In a material moving apparatus, the combination of a power-actuated tractor; a vehicle comprising crawling type ground supports and a load-carrying and hitch-securing frame pivotally mounted on the ground supports and hitched at its forward end to the tractor, said frame acting as a lever of the first class between the load and the hitch; a fairlead on the frame above and to the rear of the ground supports; a drum on the tractor above the hitch; and a line extending from the drum through the fairlead.

11. In a material moving apparatus, the combination of a power-actuated tractor; a vehicle comprising ground supports and a load-carrying and hitch-securing frame pivotally mounted on the ground supports and hitched at its forward end to the tractor; a fairlead mounted toward the rear of the frame; a drum on the tractor; a line extending from the drum through the fairlead; and a reaction wheel on the frame between the fairlead and the drum deflecting the line and controlling its direction to the drum.

12. In a material moving apparatus, the combination of a power-actuated tractor; a vehicle comprising crawling type ground supports and a load-carrying and hitch-securing frame pivotally mounted on the ground supports and hitched at its forward end to the tractor; a fairlead mounted toward the rear of the frame; a drum on the tractor; a line extending from the drum through the fairlead; and a reaction wheel on the frame between the fairlead and the drum deflecting the line and controlling its direction to the drum.

13. In a material moving apparatus, the combination of a power-actuated tractor; a vehicle comprising crawling type ground supports and a load-carrying and hitch-securing frame pivotally mounted on the ground supports and hitched at its forward end to the tractor, said frame having an upward inclination to the rear of the hitch; a fairlead at the upper end of the frame; a drum on the tractor; and a reaction roll on the frame between the tractor and the drum.

14. In a material moving apparatus, the combination of a power-actuated tractor; a vehicle comprising crawling type ground supports and a load-carrying and hitch-securing frame pivotally mounted on the ground supports and overhanging to the rear of its attachment to the ground supports and hitched at its front end to the tractor, said frame having an upward inclination to the rear of the hitch and acting as a lever of the first class between the load and the hitch; a drum on the tractor above the hitch; a fairlead on the frame above and to the rear of the attachment of the frame to the ground supports; a line extending from the drum through the fairlead; and a reaction wheel on the frame between the drum and the fairlead deflecting the line with relation to the drum.

WALTER H. NOURSE.
POWERS A. WICKES.